July 5, 1966 T. KOOTZ ET AL 3,259,485
PROCESS FOR IMPARTING AN INTERMIXING MOTION
TO A LIQUID MASS OF IRON AND SLAG
Filed Dec. 11, 1962 3 Sheets-Sheet 1

*Inventors*
THEODOR KOOTZ
ERWIN KLOTH
BY WALTER WAGNER

*Burgess, Dinklage & Sprung*
ATTORNEYS.

July 5, 1966    T. KOOTZ ET AL    3,259,485
PROCESS FOR IMPARTING AN INTERMIXING MOTION
TO A LIQUID MASS OF IRON AND SLAG
Filed Dec. 11, 1962.    3 Sheets-Sheet 2

Inventors
THEODOR KOOTZ
ERWIN KLOTH
WALTER WAGNER
BY
ATTORNEYS.

United States Patent Office 3,259,485
Patented July 5, 1966

3,259,485
PROCESS FOR IMPARTING AN INTERMIXING MOTION TO A LIQUID MASS OF IRON AND SLAG
Theodor Kootz, Hosel, Erwin Kloth, Dinslaken, and Walter Wagner, Duisburg-Hamborn, Germany, assignors to Stora Kopparbergs Bergslags Aktiebolag, Falun, Sweden, a body corporation
Filed Dec. 11, 1962, Ser. No. 243,847
Claims priority, application Germany, Dec. 13, 1961, T 21,266; Apr. 13, 1962, T 21,958, T 21,959
7 Claims. (Cl. 75—60)

This invention relates to the mixing of materials, and more particularly, to the intramixing of liquid masses. By "liquid masses" is meant any mass of material which upon the moving, as for example, by tumbling or the like, thereof, will be intramixed. Thus, the term "liquid mass" as used herein includes the mixing of two materials in liquid state, the mixing of materials in the solid state which are of particle size such that intramixing is occasioned by the tumbling or the like of the material, and the mixing of material in the solid state with material in the liquid state where the tumbling would result in intramixing of the materials.

The invention has particular application to the intramixing of metal melts with other material, for example, the mixing of molten iron with slag as a step in the refining of the iron to provide steel, especially by blowing oxygen or oxygen containing refining gas onto or into the surface of the bath or through the bath. Indeed, the present invention is the result of efforts to improve procedures for the intramixing of metal melts with other materials, more particularly, the intramixing of metal melt and slag.

In the steel making art, it is known to provide a mixing action by rotating a vessel about its longitudinal axis, the longitudinal axis being disposed in a horizontal or inclined direction. In the case of vessels the longitudinal axis of which extends vertically, it is known to position the vessel on a rotatably mounted table, the vessel being disposed at a locus eccentric to the axis of rotation of the table. Upon rotation of the table at particular frequencies, high agitation of the material within the vessel is realized and thorough mixing of the material is obtained. This procedure has the disadvantage, however, that for the treating of baths of any considerable weight, excessive forces are involved so that the requirements for equipment and power are excessive. This disadvantage can be in part overcome by providing a universal typed joint suspension for the vessel so that the vessel can be inclined to the vertical during rotation thereof and a counterbalance of the forces involved can be realized. This procedure, however, requires special design for the equipment, and, accordingly, is not a wholly satisfactory solution to the problem.

It is a principal object of the invention to provide a procedure and apparatus whereby good intramixing of liquid masses can be obtained in an economical manner. More particularly, it is an object of the invention to provide a procedure for intramixing having special application to vessels which the longitudinal axis thereof is disposed or extends vertically, and to provide for the intramixing of liquid masses contained in such vessels a procedure free of the aforementioned prior art procedures for the handling of such vessels.

According to the invention, a vessel containing a liquid mass to be intramixed, is supported about an axis thereof so that a rocking motion can be imparted thereto by application of a force at a locus suitably spaced from the axis. It has been found that if a rocking motion is imparted to a vessel so mounted by application of a force with increasing frequency so that the frequency for the mixing is approached gradually, at various frequencies between zero frequency and the mixing frequency, excessive displacement of the liquid mass occurs so that in the absence of special provision for such displacement, the material is thrown out of the vessel. It has been found that this excessive displacement can be avoided if the frequency for the mixing is applied continuously from the time at which the vessel is first put in motion. Alternatively, the excessive displacement can be avoided by avoiding those frequencies at which excessive displacement occurs.

According to the invention, an intramixing motion is imparted to a liquid mass by providing the mass in a vessel supported for a rocking motion about an axis thereof, and rocking the vessel about said axis by application of a force causing rocking thereof at a frequency providing good intramixing of the mass without excessive displacement thereof. Excessive displacement, however, occurs upon rocking at a particular frequency below the frequency for the mixing, and to avoid such excessive displacement, the rocking motion is imparted to the vessel by application of a rocking force when the vessel is substantially still and continuing the application of rocking force until the desired intramixing action is obtained at the frequency selected therefor, while avoiding the frequency at which excessive displacement occurs. This avoidance of the undesired frequency can be realized by the skipping of such frequencies. This procedure, however, has the disadvantage of requiring special operating precautions.

In a preferred embodiment of the invention, the undesired frequencies are avoided by imparting the rocking motion by application of a force at the frequency desired for the mixing while the vessel is substantially still and continuing such application until the desired intramixing action is obtained. Thus, the force utilized for providing the rocking motion can be applied at a constant frequency from the time at which the vessel is first placed in motion.

In another preferred embodiment of the invention, to facilitate the imparting of the rocking motion, the amplitude of the rocking motion is increased during the starting. Thus, the force, at the frequency desired for the mixing, can be applied initially with very low amplitude, and the amplitude can be gradually increased to the amplitude desired for the mixing action.

In general, the frequency for the intramixing can be a frequency which provides an irregular wave motion within the liquid mass, and the frequency is preferably about 2–4 times the resonance frequency. Such a frequency is particularly applicable for vessels of circular cross-section. Thus, for elongated vessels having their longitudinal axes disposed vertically and mounted for rocking motion about a horizontal axis, and which are circular in horizontal cross-section, the frequency for the intramixing is desirably about 2–4 times the resonance frequency and is such that an irregular wave motion is provided for the intramixing.

In a further embodiment of the invention, it has been found that a resonance frequency can be utilized for the intramixing frequency. Thus, for a longitudinally extending vessel disposed with its longitudinal axis extending vertically, and which is elliptical in horizontal cross-section, resonance frequency can be utilized if the force for imparting the rocking motion is applied intermediate the direction of the major and minor axes of the ellipse. Such a rocking motion will impart to the liquid mass a circular motion providing good intramixing.

The invention is further described in reference to the accompanying drawings, wherein.

In the various views of the drawings, like reference characters refer to corresponding parts.

Figure 1:
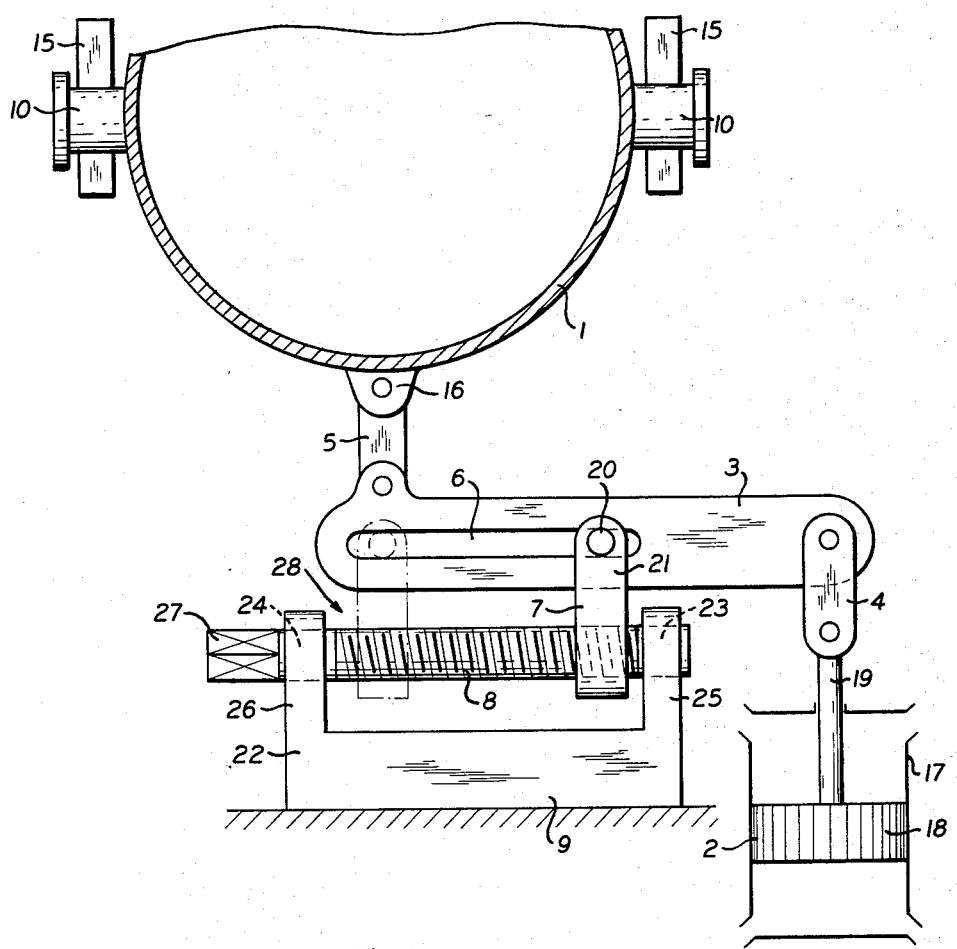
FIG. 1 is a plan view depicting apparatus according to the invention and provided with a drive employing a lever and fulcrum.

The apparatus according to the invention, includes a vessel supported for rocking motion about an axis thereof, preferably a horizontal axis, and means for imparting rocking motion of fixed frequency to the vessel. Advantageously, means are provided for varying the amplitude of the rocking motion. The invention has particular application where the vessel is a longitudinally extending vessel and has its longitudinal axis disposed vertically, and wherein the vessel is mounted for rocking about a horizontal axis. Such an embodiment is depicted in FIG. 1.

In one form of the apparatus of the invention, the apparatus includes an elongated vessel disposed with its longitudinal axis extending vertically, and is elliptical in horizontal cross-section. Means are provided for supporting the vessel for rocking motion about a horizontal axis and this axis is at an angle to the major and minor axes of the vessel horizontal, cross-section. As is described in more detail above, the use of elliptical shaped vessels permits the use of resonance frequency for the intramixing. The ratio of minor to major diameter is preferably in the range of about 1:1.2 to 1:1.5.

In another form of the apparatus of the invention, a resilient drive is provided for imparting the rocking motion to the vessel.

Figure 2:
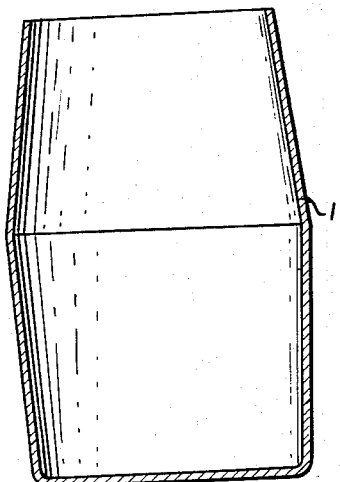
FIG. 2 is a representation of a vessel and drive means therefor for imparting to the vessel a rocking motion according to a preferred embodiment of the invention characterized in that the rocking motion is imparted in a manner employing a resilient drive.
Figure 2:
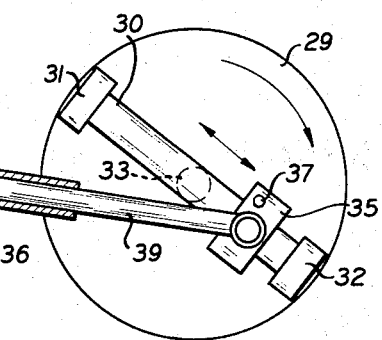
Figure 3:
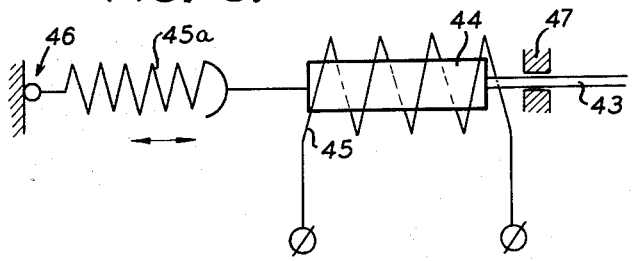
FIGS. 3–5 are representations of resilient drive means for imparting the rocking motion, wherein a solenoid assembly is utilized for imparting the rocking motion to the vessel.
Figure 4:
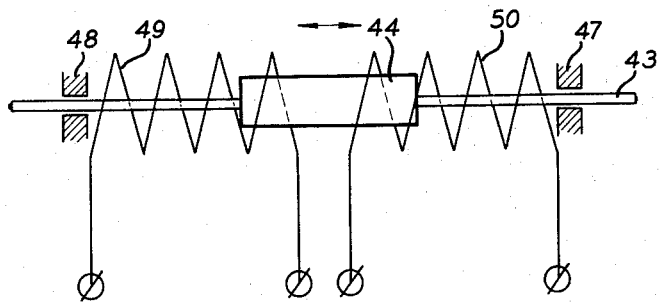

The use of a resilient drive is especially desirable for it substantially reduces the power requirements for the intramixing. For the desired thorough mixing action at the frequency selected for the mixing, a particular amplitude is necessary. This amplitude is of such magnitude that in the intramixing of materials of high specific gravities such as iron and steel, the power requirements are high. It has been found that the required amplitude at the selected mixing frequency can be substantially reduced, and therefore the power requirements can be substantially reduced, by employing a resilient drive for imparting the rocking motion. The desired resilient drive can be obtained by employing mechanical means such as spring means, or by employing electrical means such as a solenoid assembly, or by employing electro-mechanical means such as a solenoid assembly-spring combination. Utilization of spring means is depicted in FIG. 2; utilization of solenoid assemblies is depicted in FIG. 4 and in FIG. 5, and utilization of a solenoid assembly-spring combination is depicted in FIG. 3. The preferred manner for providing the resilient drive is to utilize a solenoid assembly.

The solenoid assembly is arranged so that it provides a resilient reciprocating motion, and can be provided so that the amplitude of the reciprocating motion can be varied. In general, where a solenoid assembly is employed, a shaft having a soft iron core fixedly mounted thereon is directly connected to the vessel. A solenoid winding and spring means are provided for imparting the desired reciprocal motion to the soft iron core, and therefore the shaft, or a plurality of windings are provided for controlling the movement. The windings can be provided in pairs, and by providing two or more pairs of windings, provision can be made for varying the amplitude of the reciprocating motion. Alternating current is passed through the various windings.

Preferred drive means for imparting the rocking motion to the vessel are shown in FIG. 1 and FIG. 2. As indicated in FIG. 1, an upright vessel supported for rocking about a horizontal axis is driven by a connecting rod having one end thereof connected to the vessel at a locus vertically spaced from the rocking axis, a lever is connected to the connecting rod for actuation of the connecting rod in response to operation of the lever arm, and means are provided for adjusting the throw of the lever arm to vary the amplitude of the rocking motion of the vessel. Means for actuating the lever arm, such as a piston drive, are provided so that the desired constant frequency can be obtained. If desired, means can be provided for rendering the drive resilient.

As indicated in FIG. 2, the drive can include a spindle mounted for rotation about a transverse axis thereof. The spindle is disposed relative to the vessel so that its transverse axis of rotation is in a plane which is vertical to the direction of the rocking motion of the vessel. A connector fitting is mounted on the spindle at a locus spaced from the said transverse axis thereof, and a connecting linkage interconnects the connector fitting with the vessel. Thus, the connector fitting is provided so that it is eccentric with respect to the transverse axis of rotation of the spindle and upon rotation of the spindle about said axis thereof, the connector fitting moves so as to reciprocate the connecting linkage and, thereby, the desired rocking motion is imparted to the vessel. Preferably, the connector fitting is movable along the longitudinal axis of the spindle so that the distance between the transverse axis of rotation of the spindle and the connector fitting can be varied to, in turn, vary the amplitude of the rocking motion imparted to the vessel.

Figure 1A:
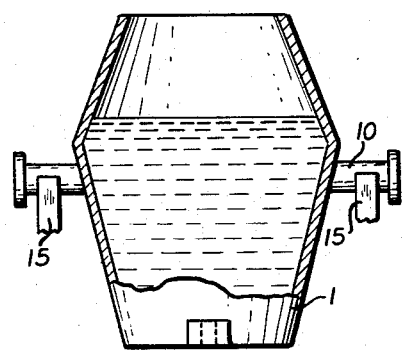
FIG. 1a is an elevation view, partially in cross-section, of the vessel shown in FIG. 1.

Referring to FIG. 1, and FIG. 1a, the vessel 1, which can be a converter, is a longitudinally extending vessel having its longitudinal axis disposed vertically. The vessel is provided with support arms 10 which are received in the journal box 15. The mounting of the vessel in the journal box 15 is such that the vessel can be tipped and therefore rocked about the horizontal axis extending through the support arms 10. For imparting the rocking motion to the vessel, a lever arm is utilized. The lever arm 3 is connected at one end thereof to the connecting rod 5 which in turn is connected to the vessel lug 16. The other end of the lever arm 3 is connected to engine drive 17 which can be a steam engine constructed to drive the engine piston 18 at a constant rate of reciprocation. The piston rod 19 is connected to the lever arm 3 by link 4. The fulcrum pin 20 passes through a slot 6 in the lever arm 3 and is supported by a fulcrum support 21. The fulcrum support 21 is threaded onto threaded shaft 8, and the threaded shaft 8 is mounted in a carriage 22. Plane end portions 23 and 24 are received respectively in the upright arms 25 and 26 of the carriage 22, and said plane end portions are freely turnable in the arms. End portion 27 of the shaft projects outwardly beyond the adjacent support arm 24 and is formed to receive a wrench for turning of the shaft 8. By turning the shaft 8, the fulcrum connector 21 can be moved axially of the shaft, and, accordingly, the fulcrum point along the lever 3 can be shifted. The slot 6 in the lever arm 3 permits movement of the fulcrum pin 20 along the lever arm. Thus, the throw of the lever arm can be adjusted, and, thereby, the amplitude of the motion of the connecting rod 5 and therefore the amplitude of the rocking movement of the vessel can be varied. Advantageously, the slot 6 extends from about the center of the lever arm towards the end thereof connected to the connecting rod 5 and permits the movement of the fulcrum pin 20 to a position such that the throw of the lever arm imparting movement to the connecting rod 5 is zero. Such an arrangement permits adjusting the drive means so that initially the amplitude of rocking movement is zero while the speed of the engine drive 17 is at the desired frequency. The position of the fulcrum pin and fulcrum fitting for zero amplitude is indicated in phantom in FIG. 1 and by the reference number 28. Following starting at zero amplitude, the fulcrum connector 21 can be pulled gradually so as to gradually increase the amplitude of the rocking motion and in this way the vessel can be brought up to the desired condition by applying constant frequency and gradually increasing the amplitude.

As an alternative to the drive means and drive connection shown in FIG. 1, a direct coupled drive could be used. Thus, a motor or engine could be directly connected to the connecting lug 16 on the vessel 1, provided the drive is outfitted to impart a constant frequency, and, preferably, such a drive should be provided with means for varying the amplitude.

Whereas the drive shown in FIG. 1 is a reciprocating piston drive, if desired, an eccentric drive can be utilized. Such a drive is shown in FIG. 2. The eccentric drive includes a turntable 29 having mounted thereon a spindle 30. The spindle 30 is a cylindrical rod having its ends received in the bearing blocks 31 and 32. The longitudinal axis of the spindle 30 is parallel to the plane of the turntable 29. The turntable is mounted on a rotatable shaft 33, and the turntable can be rotated by rotation of the shaft 33, whereby the spindle 30 is rotated about a transverse axis of the spindle. The transverse axis of the spindle and the axis of rotation of the shaft 33 are each in a plane perpendicular to the direction of the rocking motion as is indicated by the arrow 34. A connector fitting 35 is mounted on the spindle 30 at a locus spaced from the transverse axis of rotation of the spindle, and this connector fitting is connected to the vessel 1 by a connecting linkage 36 in a manner to transmit to the vessel 1 motion corresponding to the movement of the connector fitting, whereby to impart the rocking motion to the vessel. The connecting linkage 36 can be a resilient connecting linkage, as is indicated in FIG. 2, and as is explained in more detail hereinafter, or it can be a direct connection as can be provided by a continuous connecting rod joining the connector fitting 35 with the lug 5 of the vessel 1. It will be observed that by reason of the spacing of the connector fitting 35 from the transverse axis of rotation of the spindle, a cranking action is provided for, in turn, providing the rocking motion.

In order to permit variation in the amplitude of the rocking motion, the connector fitting 35 is provided so that it can be selectively positioned on the spindle 30. Thus, a set screw 37 serves to hold the connector fitting 35 in a fixed position along the spindle 30, and the position of the connector fitting on the spindle 30 can be changed by loosening the set screw 37, and moving the connector fitting to the position desired. The set screw 37 can then be again tightened to secure the connector fitting in its new location. Advantageously, the mounting of the connector fitting is such that it can be moved to the transverse axis of rotation of the spindle so that, though the turntable is being turned at the normal rate, the amplitude for the rocking motion is zero.

In a preferred embodiment of the invention, means are provided for resiliently driving the vessel to provide the rocking motion. For this purpose, spring means can be provided, and such means are indicated in FIG. 2. Thus, the connecting linkage 36 includes a first rod 38 which is directly connected to the lug 5 of the vessel 1, and a second rod 39 which is directly connected at one end thereof to the connector fitting 35. The linkage 36 further includes a sleeve 40 which receives in one end thereof, an end portion of the first mentioned rod, namely, rod 38. The sleeve 40 is welded to the rod 38 as is indicated by the reference numeral 41. The free end portion of the second mentioned rod 39 is slidably received in the other end of the sleeve 40. Within the sleeve interposed between the confronting ends of the rods 38 and 39, is a coil spring 42. The coil spring 42 serves to transmit motion of the rod 39 to the rod 38, and this transmission is a resilient transmission. As has been described above, the utilization of a drive having means for resiliently transferring motion to the vessel results in a substantial reduction of the amplitude required for thorough mixing at a particular frequency.

A resilient drive can be provided utilizing a solenoid assembly, and a drive wherein a solenoid assembly in combination with a spring means is depicted in FIG. 3. The connecting rod 43 is directly connected to the vessel to be rocked, and a soft iron core 44 is fixedly mounted on the connecting rod 43. A winding 45 is provided for the core for solenoid action therewith. The end of the soft iron core opposite the connecting rod is connected to a coil spring 45a, and the coil spring in turn is connected to a fixed support as is indicated by the reference numeral 46. The coil spring urges the soft iron core to the left in FIG. 3, and upon passing an alternating current through the winding 45, the core will be drawn to the right in response to the current. This action of the current on the soft iron core will extend the coil spring 45a until the coil spring retracts the soft iron core towards the left. Such operation results in a reciprocating motion of the soft iron core, and, accordingly, of the connecting rod 43, whereby the desired rocking movement can be imparted to the vessel. The solenoid acts as a spring along with the same action by the spring itself, and this results in a highly desirable resilient reciprocating drive. The amplitude can be regulated by displacing the winding 45 axially with respect to the spring 45a.

Instead of utilizing the combination of a solenoid assembly and a coil spring, as is depicted in FIG. 3, a solenoid assembly having a pair of windings can be utilized. Such an arrangement is depicted in FIG. 4. Thus, the rod 43 which is directly connected to the vessel to be rocked, is slidably received in bearing sleeves 47 and 48, and has fixedly mounted thereon a soft iron core 44. Alternating current is passed through the windings 49 and 50 and imparts to the soft iron core, and therefore the connecting rod 43, the desired reciprocating motion. Here again, amplitude can be varied by axial displacement of the coils 49 and 50 with respect to each other.

Figure 5:
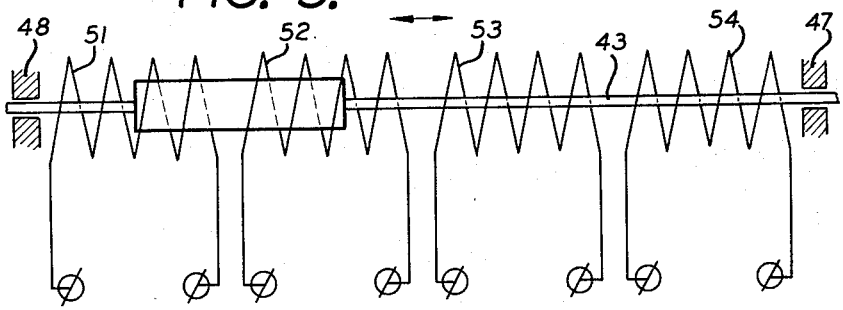

For providing for variation in amplitude, if desired, a plurality of pairs of windings can be provided. Thus, as is shown in FIG. 5, a pair of windings including winding 51 and winding 52, and a second pair of windings, including winding 53, and winding 54, are provided in axially spaced relation with respect to the connecting rod 43. For operation, a single pair of the windings can be energized for a small amplitude, and for a larger amplitude both pairs of coils can be operated. The coil pairs are separately supplied with current.

The use of electrical power for the driving of the vessel, offers advantage that turning parts are not required, and the further advantage that a simplified construction permitting dependable and close control is thereby realized. Where a solenoid assembly or solenoid assemblies are employed, the frequency of the alternating current can be the frequently desired for the rocking motion.

Figure 1B:
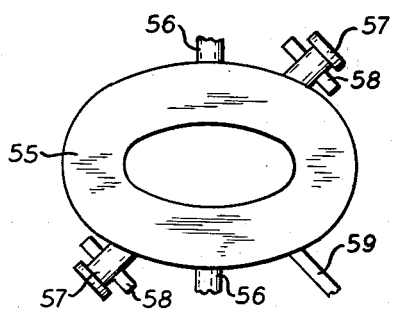
FIG. 1b is a plan view of an elliptical shaped vessel outfitted for rocking according to the invention.
Figure 1C:
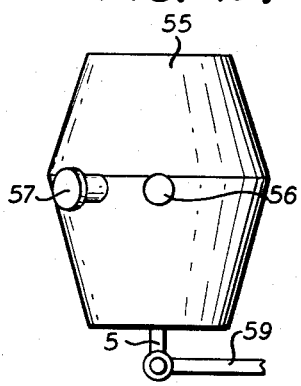
FIG. 1c is an elevation view of the elliptical vessel shown in FIG. 1b.

As has been described previously, when rocking a longitudinally extending vessel disposed with its longitudinally extending axis upright (vertical), the frequency for thorough mixing, according to the invention, is a frequency which can be about 2–4 times the resonance frequency, and is such that an irregular wave motion is imparted to the liquid mass being subjected to intramixing. This applies to vessels of circular horizontal cross-section. It has been found, as previously stated, that the resonance frequency can be utilized for the mixing frequency and that the resonance frequency will impart a circular motion to the material, which motion provides thorough intramixing, and, yet, does not cause so much displacement of the material as to throw the material out of the vessel, if a vessel having an elliptical shape in horizontal cross-sections is used. Such a vessel is indicated in FIG. 1b and FIG. 1c. The vessel 55 is of elliptical form in horizontal cross-section and is provided with support arms 56. The support arms 56, in the case of a converter, are normally used for supporting the vessel and permit the tilting of the vessel for the discharge of material therefrom. The supporting arms 56 are disposed along the minor diameter of the ellipse of the vessel. By the use of an elliptically shaped vessel and the dumping by pivoting about an axis along the minor diameter of the vessel ellipse, advantage is realized in that a good separation of metal and slag can be obtained during the dumping. According to the invention, to obtain mixing of material within the vessel at resonance frequency, the vessel should be mounted for rotation about a horizontal axis which is at an angle to each the minor and major diameter of the vessel ellipse. Thus, for the intramixing, the vessel is provided with the support arms 57, and journal blocks 58 are provided for receiving the support arms. The force for imparting the rocking motion is applied in a direction perpendicular to the axis through the support arms 57, and for applying this force, connecting rod 59 is connected to the vessel lug 5. Any suitable means can be provided for moving the vessel to the journal blocks 58 for the intramixing of the liquid mass.

In the practice of the procedure of the invention, and in the utilization of the apparatus of the invention, the vessel is preferably supported at its center of gravity, and the rocking action is provided by application of a force appropriate to provide a mono-axial movement of the vessel. For the mixing of liquid masses or baths less than about 1 m. in depth, an irregular wave motion as is desirable when vessels of circular cross-section are used, suffices to provide good intramixing action. The utilization of an irregular wave motion is desirable in that the displacement of the liquid mass for such operation is less than the displacement which occurs for rocking at resonance. Upon rocking at resonance, a circular motion is set up and the displacement is more than it is for an irregular wave motion. By "displacement" is meant the extent to which the material, during intramixing, rises above the normal level which the liquid mass assumes at rest. The optimum frequency for intramixing, according to the invention, can readily be determined by experimenting with the material and the apparatus employed. The optimum conditions and the optimum amplitude will depend on the particular equipment used.

EXAMPLE

A normal converter vessel for refining pig iron to steel was mounted on pivots near the middle of its vertical dimension. It had an inner width of 400 cm. and an inner height of 800 cm., the capacity being 150 metric tons. This converter vessel was at its bottom connected to a connecting rod by means of which to-and-fro motion vertical to the longitudinal axis was imparted to the vessel. This motion was effected with a constant frequency of 3 seconds for one cycle. The length of this perpendicular motion grows from zero to 270 cm. in a time of 30 seconds steadily and uniformly. That means that the bottom of the converter and because of the support of the vessel near the middle of its vertical length also the mouth travels 135 cm. from the vertical to both sides once in 3 seconds. Shortly before reaching of this amplitude of 270 cm. a rhythmic change of the flame and of the sparkling shows that the content of the converter has been brought into circular motion. This motion is adapted to promote metallurgical processes either during blowing of a refining gas or without blowing.

While the invention has been described with reference to particular embodiments thereof, various modifications and alterations will occur to those skilled in the art, and it is desired to secure by these Letters Patent all such changes as are within the scope of the appended claims.

What is claimed is:
1. Process for imparting an intramixing motion to a liquid mass of iron and slag which comprises:
   (a) providing the mass in a vessel having an open top supported for a rocking motion about a horizontally extending axis;
   (b) rocking the vessel about said axis by application of a force causing rocking thereof at a frequency and amplitude providing good intramixing of the mass without excessive displacement thereof;
   (c) imparting said rocking motion at said frequency and amplitude by application of said force at rocking frequency when the vessel is substantially still and continuing said application while increasing the amplitude until the desired intramixing action is obtained.
2. Process according to claim 1 wherein said frequency is in the range of about 2-4 times resonance frequency and provides an irregular wave motion.
3. Process according to claim 2, said vessel being circular in horizontal cross-section.
4. Process according to claim 1 wherein said vessel is elliptical in horizontal cross-section and said horizontally extending axis for the rocking motion is intermediate the direction of the major and minor axis of the vessel and said frequency is resonance frequency, whereby circular motion is imparted to the mass.
5. Process according to claim 1, wherein said frequency is resonance frequency.
6. Process according to claim 1, wherein simultaneously with said intramixing of slag and iron, an oxygen-containing refining gas is contacted with the iron.
7. Process according to claim 1, said frequency being above a frequency which would impart excessive displacement of the slag.

References Cited by the Examiner

UNITED STATES PATENTS

| | | | |
|---|---|---|---|
| 404,414 | 6/1889 | Jones | 75—61 |
| 1,531,674 | 3/1925 | Martin | 259—75 |
| 1,856,716 | 5/1932 | Maschmeyer | 75—60 |
| 2,552,188 | 5/1951 | Krause et al. | 259—75 |
| 2,640,907 | 6/1953 | Morey | 259—75 |
| 3,034,885 | 5/1962 | Hardt | 75—60 |
| 3,098,740 | 7/1963 | Hardt | 75—61 |

FOREIGN PATENTS

| | | |
|---|---|---|
| 801,156 | 9/1958 | Great Britain. |

BENJAMIN HENKIN, *Primary Examiner.*